United States Patent [19]
Dobert

[11] Patent Number: 5,150,284
[45] Date of Patent: Sep. 22, 1992

[54] TEMPORARY REPLACEMENT SAFETY LIGHT SYSTEM

[76] Inventor: Frank C. Dobert, Earlton Gayhead Rd., Box 204, Earlton, N.Y. 12058

[21] Appl. No.: 820,353

[22] Filed: Jan. 14, 1992

[51] Int. Cl.⁵ .............................................. F21L 7/00
[52] U.S. Cl. ................................... 362/83.1; 362/191; 362/398; 248/309.4; 248/205.2; 248/683
[58] Field of Search ................. 362/83.3, 61, 80, 190, 362/191, 398; 248/309.4, 683, 205.2

[56] References Cited

U.S. PATENT DOCUMENTS

| | | |
|---|---|---|
| 2,667,569 | 1/1954 | Lethcoe . |
| 2,905,925 | 9/1959 | Whiteneck . |
| 3,691,366 | 9/1972 | Spreuer . |
| 3,924,117 | 12/1975 | Brindley ............................ 362/398 |
| 4,091,442 | 5/1978 | Markey . |
| 4,286,309 | 8/1981 | Rasinski . |
| 4,400,763 | 8/1983 | Kribs et al. ......................... 362/190 |
| 4,423,472 | 12/1983 | Duthu . |
| 4,754,376 | 6/1988 | Winslow ............................ 362/191 |
| 4,776,766 | 10/1988 | Brent . |
| 4,903,174 | 2/1990 | Busby . |
| 4,972,301 | 11/1990 | Kashoske . |
| 5,010,454 | 4/1991 | Hopper . |

Primary Examiner—Carroll B. Dority
Attorney, Agent, or Firm—Schmeiser, Morelle & Watts

[57] ABSTRACT

In a temporary safety light replacement system a self contained individual safety light which is adapted to be secured as a replacement in close proximity to a broken safety light. The light has a self contained power supply and a recess switch which is not visually discernable and is protected from the elements when the safety light is secured to the vehicle. A special receptacle serves as a reflector when the receptacle is in its closed position and when moved to an open position secures two sides of the safety light to accomplish a strong positive attachment.

9 Claims, 2 Drawing Sheets

TEMPORARY REPLACEMENT SAFETY LIGHT SYSTEM

FIELD OF THE INVENTION

Generally, this invention relates to the field of vehicle lighting systems. More specifically, this invention is a self contained temporary replacement safety light system for trucks where independent and discrete light units may be located in close proximity to and as replacements for broken safety lights.

BACKGROUND OF THE INVENTION

Virtually all vehicles are required by law to have safety or driving lights which must be utilized during darkness. This requirement applies to night driving but may also apply to a period of time during the transition period known as dusk as well during times of severe weather conditions. The requirement of these safety or driving lights applies in one form or another to almost all motor vehicles, from the singular driving lights on the back of a motorcycle to the extensive lighting systems required on tractor trailers. For the purposes of this application this invention will be considered relative to its use on large trucks, including tractor trailers.

Unfortunately, these lighting systems are extremely vulnerable to breakage either due to impact, electrical wiring failures, or simply because a light bulb burns out from normal use. This problem is exacerbated when dealing with truck lighting systems both from the perspective of increase breakage as well as the increased danger due to loss of lighting. By their very nature trucks are constantly being loaded and unloaded which often requires backing up to loading docks or entering locations where conditions are adverse as is the case in many situations such as picking up logs, animals, hay or other product which require the truck to travel to work areas where lights can be easily damaged. Furthermore, the loading and unloading processes often include the movement of heavy objects and the concomitant use of hand carts, fork lifts or other moving equipment which often damage lighting. The truck driver must also depend on the capabilities of those hired to load and unload the truck and is subject to the care or carelessness of those individuals.

Adding to the problem of normal usage is the additional factor, depending upon where the truck must travel or be parked, that truck lights can also the subject of vandalism especially in city areas.

For a greater appreciation of this problem, one need only to consider all of the products in ones home or office. By considering these items, from the mail which arrives daily to the lumber or steel used to construct the building, one soon realizes that virtually all of these items, have traveled at least once and often many times on a variety of different vehicles to reach their final destination. With this understanding one can begin to appreciate the vast scope of trucking and the numerous sites that trucks must travel to and from every day.

Compounding the problem of these broken lights is the fact that trucks generally travel on a relatively tight and well defined schedule. These schedules are often dictated by the companies or individuals who must be involved in the loading or unloading of the vehicle and only have personnel available during certain hours and/or shifts. Any trucker or trucking company will soon find themselves out of work if they are unable to meet the time schedules of the clientele which they serve. Whether one is dealing with overnight mail delivery services, fresh seafood for restaurants, or any one of a myriad number of other items tight and often difficult to meet schedules are integral to a trucker's life. Thus, whenever possible truck maintenance and repair is accomplished during normal down time when the truck is idle between runs. Most certainly, where a light or group of lights is damaged during the loading of a truck it is virtually impossible for the driver to take the time necessary to find a repair station, wait for the repairs, and still maintain the required time schedule. Cost effectiveness also becomes a factor since going to various service stations for repairs can be quite costly whereas the driver or company repair services can usually repair lighting failures efficiently and inexpensively if the trucker can complete his scheduled runs and get the truck to its next period of down time.

The practical result of these difficulties is that when a truck has a damaged light or even total loss of safety lighting systems the trucker will generally continue the run until the next period of down time. This results in conditions which are unsafe for both the truck driver and others on the road.

While one may think that the size of a truck alone makes it easily noticeable, the opposite is actually true. Because the truck is so large when it travels without lights other drivers coming upon the back or side of the truck, as happens when merging into traffic, may have only the vastness of the truck in their instantaneous field of vision. Essentially, the truck blocks out all backdrops in the other drivers line of sight which in some situations, for a few seconds, can make the truck almost invisible or at best hinder the other drivers ability to determine the distance to the truck. For example, when a driver turns a corner or seeks to merge into traffic and sees only a wall of blackness (the side or back of an unlit truck) he either becomes momentarily disoriented or else assumes the pathway is clear. In either event, the results of such an encounter are often tragic.

Another part of this problem is the fact that law enforcement officials impose significant fines for trucks with improper safety lighting. This is accomplished generally at truck check points and by law enforcement patrols. However, an interesting aspect of this is that the fines, although severe are not really meant to solve the problem but only keep it somewhat under control. It is recognized that truckers must travel with broken lights in order to keep their schedules and therefore these fines are fixed at a rate which encourages the driver to have the lights repaired during the trucks down time but the fines are not so onerous that the driver is forced to make the repairs during actual runs. This is because it is recognized that too much of our daily life depends on truck schedule maintenance and to affect these runs would not only cause severe financial hardship on the trucking companies but would dramatically effect businesses and individuals relying on those deliveries.

In an attempt to deal with this problem, harnesses with a plurality of safety lights have been suggested that plug into a truck cigarette lighter and thereby replace broken safety lights. Also, other lights have been provided which may be tied into the vehicle electrical system in order to achieve proper safety lighting.

The shortcomings with all of these approaches are several fold. First, where the installation of the backup safety lighting system is almost as time consuming as having the light repaired, no significant advantage is obtained. Secondly, where the lighting difficulty lies in the electrical system of the truck, tying a replacement light into that electrical system is meaningless.

After studying this problem and the various factors involved I made the following observations. That there was a need for a temporary replacement safety lighting system for trucks. That the system must remain intact despite the speed that the trucks travel, poor road conditions, and adverse weather conditions such as sleet, snow, rain etc. In addition, due to vandalism and theft the lighting system would need to appear to be an integral part of the vehicle and not easily removable. For similar reasons, the means for activating the light should not be so readily accessible that they could be easily turned off by those seeking to do mischief. Furthermore, the system needed to be protected from the elements both in its capacity to function as a light as well as its securement to the vehicle.

It was with these various problems and goals in mind that I began the development of a safety replacement light system which resulted in the subject invention.

SUMMARY OF THE INVENTION

The subject invention overcomes the problems traditionally experienced regarding truck lighting systems. In addition, shortcomings inherent in the prior attempted solutions to these problems have also been solved.

This is accomplished through the use of a completely independent set of safety lights. Each safety light is suitable for individual use and contains its own power supply thus avoiding the need for wiring or time consuming mounting of an alternative lighting system. Each individual light has its own switch for turning the light on and off. This switch can be specifically located within the securement means for attaching the light to the truck so that the light has a permanent appearance and easy access to the on/off switch is avoided. In addition, this arrangement serves to prevent damage to the light due to adverse weather conditions which, if in contact with the switch, could damage the light.

Where the preferred attachment means is used a prepared surface is maintained free of debris and the like for quick and secure attachment of an individual light when needed. This configuration utilizes a light receptacle which is normally maintained in a closed position and has an outer surface which appears as a standard truck reflector. In its open position an individual light is secured on two sides, preferably top and back, within the receptacle. This two sided securement both prevents the lights from coming loose during travel and also helps avoid theft. This is especially true where the attachment means requires a peeling force for detachment in which case the top securement means must be peeled off by raising the top of the receptacle after which the light itself can be peeled from the back securement against the truck. For this purpose hook and material type fasteners of the kind marketed under the trademark VELCRO are very suitable.

In order to keep the securement area clean during nonuse the sides of the receptacle which abut each other when the receptacle is in its closed position also secure the receptacle in the close position and allow the gasket around the receptacle to aid in preventing any debris from contacting the securement surfaces.

In operation, the truck driver who recognizes that one or more of his safety lights are not functioning simply gets an individual safety light for each of the nonfunctioning ones. If the truck is not fitted with special receptacles the safety light, with its hidden on/off switch is turned on and secured to the vehicle in close proximity to the nonfunctioning light. The light will continue to burn for more than 12 hours which is generally sufficient to allow the driver through any period of darkness. In addition, the batteries powering the light may either be replaceable or rechargeable. In the former situation, should the light begin to fail the driver simply needs to replace the battery and continue operation. Generally, in this situation the securement means to the truck is by magnet, as this will attach the light to most trucks in a sufficiently secure fashion.

Where the truck has been previously fitted with receptacles, the driver selects a replacement light, turns it on and then lifts the reflector/receptacle cover and secures the light against the back of the receptacle and then brings down the top leaf of the receptacle on to the top of the light. This top leaf also secures the light in a second plane thus, accomplishing a more secure attachment. When the driver is having the original light fixed, he simply raises the top leaf off the receptacle, which, if Velcro is being used, will provide the necessary peeling force to disengage the top securement. Thereafter the light is peeled off of the back surface and the receptacle is returned to its closed position. In the closed position, the receptacle leaves will secure to each other forming a gasketed seal about the receptacle and maintaining the Velcro or other attachment surface in a clean, dry and ready to use state. If desirable, the rechargeable battery may be adapted for recharging through the cigarette lighter of the truck's electrical system. Thus, the driver can very simply maintain the batteries in a fully charged state when traveling. Similarly, if the driver is on a long run which will not enable him to have the lights fixed for several days and, if the battery within an individual unit is not sufficient to maintain the light, substitute lights can be used which the driver can alternately recharge.

DETAILED DESCRIPTION OF THE DRAWINGS

Figure 1:
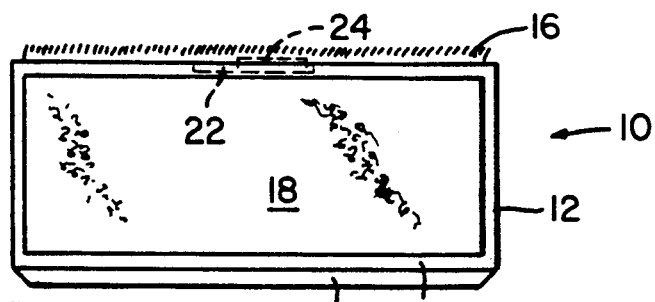
FIG. 1 is a top plan view of the invention.

FIG. 1 discloses the temporary safety light replacement designated as 10. The safety light 10 has a plurality of sides including a top side 12, front side 14 and bottom side 16. The top side 12 is covered by material 18 and the bottom side 16 has a plurality of hooks 20. The material 18 and the hooks 20 are of the type which may be secured together and are commonly marketed under the trademark VELCRO. On the bottom side 16 is a recess 22 in which resides a switch 24 for turning the safety light on and off.

Figure 2:
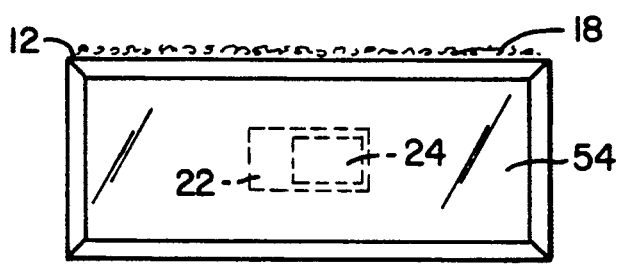
FIG. 2 is a front elevational view of the invention showing the recess switching mechanism in phantom.

FIG. 2 is a front elevational view which clearly shows the front side 14 which is covered by a lens 26. The lens is generally of a configuration similar to truck safety lights and is of a color such as yellow or amber commonly used for such safety lights. However, other configurations and colors could be used as desired. Replacement lenses could also be provided so that a user could utilize the same safety light for different purposes simply by switching the lenses for example, from amber to red. Shown in phantom is the switch 24 in its off position with an arrow indicating the switch is slidable to an on position. The recess 22 is preferably centrally located in the bottom side 16 of the safety light.

Figure 3:
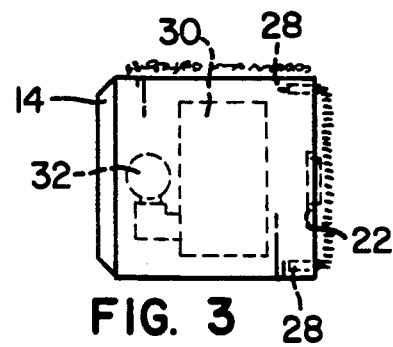
FIG. 3 is a side elevational view of the invention.

FIG. 3 is a side elevational view showing in phantom screws 28 which secure the bottom side 16 in place. This provides access to the battery 30 which is within the safety light and may be of a normal configuration or rechargeable. The actual connection of the switch 24 to the battery 30 and the light bulb 32 is of any known configuration and wiring and therefore is not shown in detail.

Figure 4:
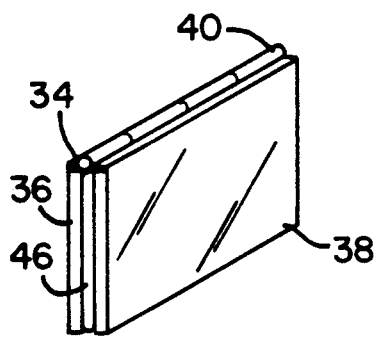
FIG. 4 is a perspective view of the receptacle in its closed position.
Figure 5:
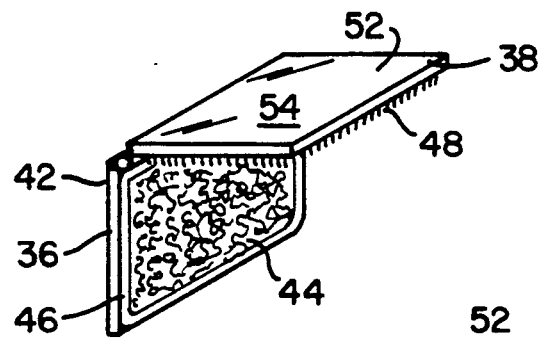
FIG. 5 is a perspective view of the receptacle in its open position.

FIG. 4 discloses the receptacle 34 which can be used to receive the temporary safety light replacement 10. The receptacle, as shown in FIGS. 4 and 5 has a first leaf 36 and a second leaf 8 which are hingedly connected to each other by hinge 40. The leaves 36 and 38 are movable between a closed position as shown in FIG. 4 and an open position as shown in FIG. 5. The first leaf has a flat side 42 which, when the receptacle 34 is secured to the truck, will abut and contact the truck and be secured thereto either by an adhesive, screws or any other mode of secure attachment. The opposite inner side 44 of the first leaf is a securing surface which as shown is covered with material. About the outer perimeter of the first leaf is a gasket 46 which seals and protects the inner portion of the receptacle when it is in its closed position.

The second leaf 38 has an inner surface 48 which, as shown, has a plurality of hooks. The material and hooks of the receptacle are of the same type as material 18 and hooks 20 on the safety light. When the receptacle is in its closed position the hooks on the inner surface 48 contact and secure to the material on the inner side 44 of the first leaf, thus securing the receptacle in its closed position and forming a seal by means of gasket 46 around the periphery of the leaves.

Figure 6:
FIG. 6 is a perspective view of the receptacle and light assembly just prior to attachment.

It should be appreciated that in all places where the material and hooks have been shown one could use magnets or a combination of magnets and magnetically attracted materials as shown in FIG. 6. In this configuration the bottom side 16 is a magnet 50 which is attracted to the inner side 44 of the first leaf 36. The top side 12 would preferably be a magnetically attracted material which would interact with a magnet 51 on the inner surface 48 of the second leaf. In the same way as shown in FIGS. 1-3 a central portion of the magnet on the bottom side 16 would be cut out to provide the recess for the switch 24.

Figure 7:
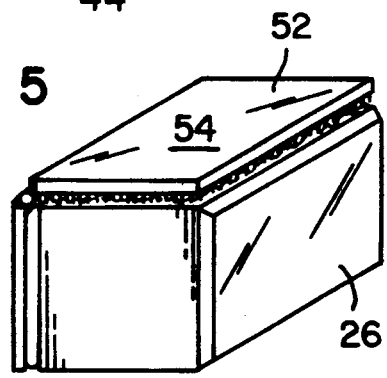
FIG. 7 is a perspective view of the receptacle and light system secured in place.

As shown in FIG. 7, when secured in place the safety light 10 fits within the receptacle 34. In this configuration or where the magnets are simply used directly on the truck the switch 24 is not visually discernable because it is in the bottom side 16 which is secured against the receptacle or the truck depending on which attachment is used. Because of the nature of the material and hook attachment removal of the safety light cannot be easily accomplished simply by pulling on the light. This is because the hook and material connection is such that a peeling force easily separates the two but a straight line pull or a shearing force is, under normal conditions, not sufficient to separate the hooks and material. Thus, is it necessary to raise the second leaf 38 so that a type of peeling removal force is applied separating the second leaf from the top side 12. After that has been accomplished the user may peel the safety light from the securing surface of the first leaf preferably by rolling it off of the leaf with a downward motion applied toward the front side 14.

In my preferred embodiment the second leaf 38 has an outer side 52 which is a reflector 54. This reflector is of a type and appearance commonly used on trucks and other vehicles. Thus, when the receptacle is in its closed position it is not readily discernable that the receptacle is any different from a normal reflector.

Figure 8:
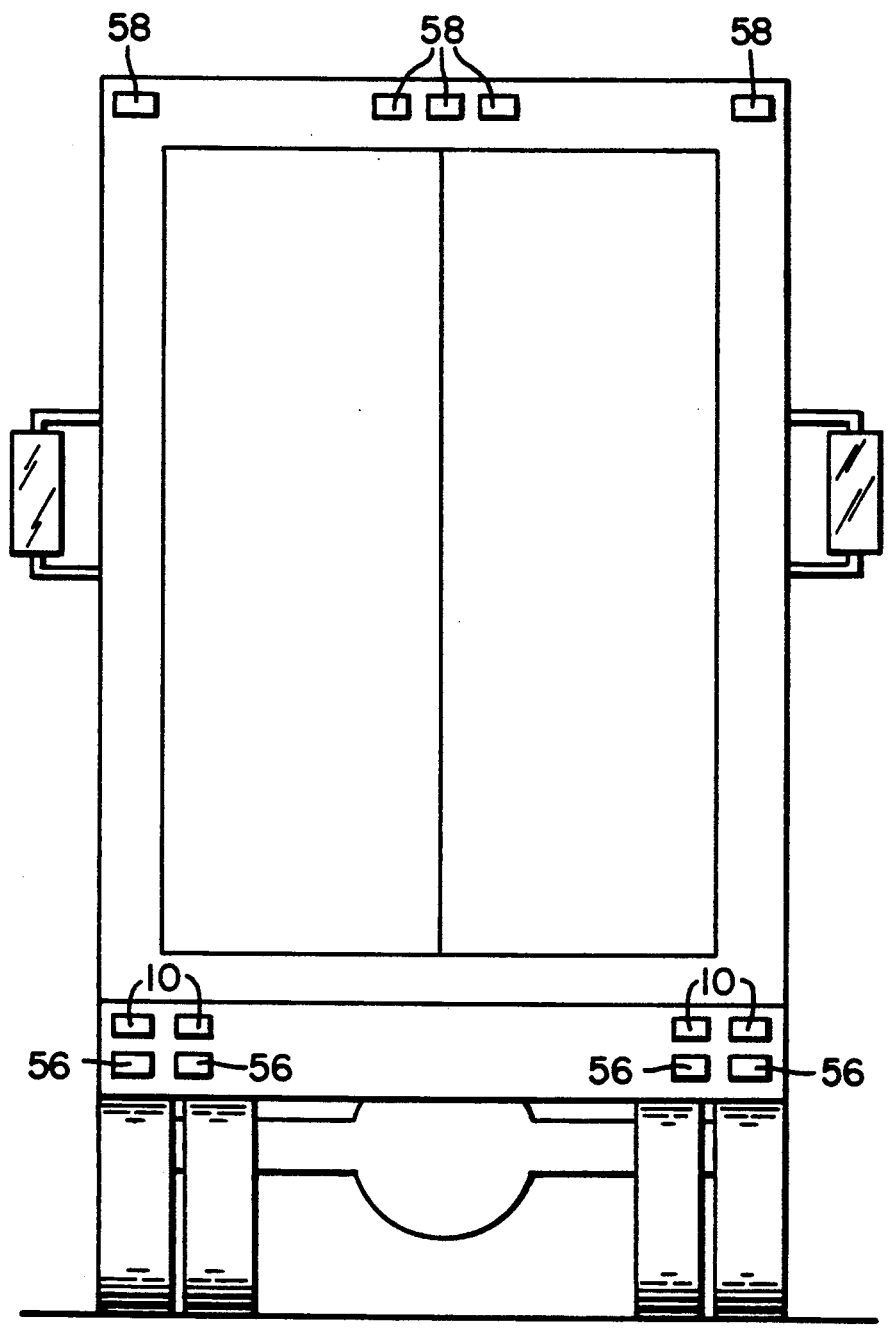
FIG. 8 is a rear elevational view of a truck with the light receptacles in place relative to the normal safety lighting systems.

FIG. 8 shows the back of a somewhat typical tractor trailer. In this situation, one may have rear lights 56 above which are receptacles 34. Should one of the rear lights fail to function the driver can simply open one of the receptacles 34 and insert a temporary safety light 10. Similarly the top installed safety lights 58 could also have adjacent receptacles 34 or have safety light replacements 10 secured directly to the truck in close proximity should any of these top safety lights 58 fail to function. Thus, while FIG. 8 shows a particular lighting system on a truck it should be appreciated that any configuration can be used with the present invention.

While the above describes the preferred embodiment of the invention, it is intended that the invention be limited only by the appended claims. Accordingly, variations may be made to the invention without departing from the essence of the invention as contained in said claims.

I claim:

1. A temporary safety light replacement system for automotive vehicles comprising:
   a safety light having a plurality of sides, said light having a lens on a front side through which the light shines, said lens having a predetermined shape and color;
   a self contained energy source within the safety light;
   a switch on the safety light for turning the light on and off;
   a holder adapted to be secured to the vehicle, said holder having a first and second securing surface to receive the safety light; and
   means for connecting said first and second securing surfaces for movement between an open and closed position;
   wherein said securing surfaces receive and secure at least two sides of the safety light, and wherein said first and second securing surfaces are adapted to engage and attach to each other holding the holder in the closed position if said safety light is detached from such.

2. The invention of claim 1 wherein said holder further comprises two leaves hingedly connected to each other, the first of said leaves having a flat side which abuts and attaches to the vehicle, the opposite side of said first leaf being a securing surface, the second leaf having an inner leaf side which is a securing surface, and an outer leaf side opposite thereto.

3. The invention of claim 2 wherein the outer leaf side of the second leaf is a reflector.

4. The invention of claim 2 wherein one of the securing surfaces has a plurality of hooks and the other securing surface is made of material into which the hooks secure on contact, said safety light having a side with a plurality of hooks to mate with the material securing surface, and another side on the safety light with a material covering to mate with the hooked securing surface.

5. The invention of claim 2 wherein the securing surfaces are magnetically attracted to each other, and each of at least two sides of the safety light is magnetically attracted to at least one of the securing surfaces.

6. The invention of claim 2 further comprising:
a gasket around the leaves which forms a seal to prevent matter from entering between the leaves when they are in the closed position.

7. A temporary safety light replacement system for automotive vehicles comprising:
a safety light having a plurality of sides, including a bottom side having means for securing the light to a vehicle and an opposite front side having a lens through which the light shines, said lens having a predetermined shape and color; and
a switch for turning the light on and off, said switch being recessed on the bottom side such that when the safety light is secured to a vehicle the switch is not visually discernable and at least partially protected from adverse weather conditions.

8. The invention of claim 7 wherein said securing means is a magnet.

9. The invention of claim 8 wherein a substantially centralized portion of the magnet is cut out forming a recess in which the switch resides.

* * * * *